Nov. 4, 1941.  E. GRANAT  2,261,249
TRANSMITTING STATION FOR DISTANT CONTROL SYSTEMS
Filed Dec. 20, 1937
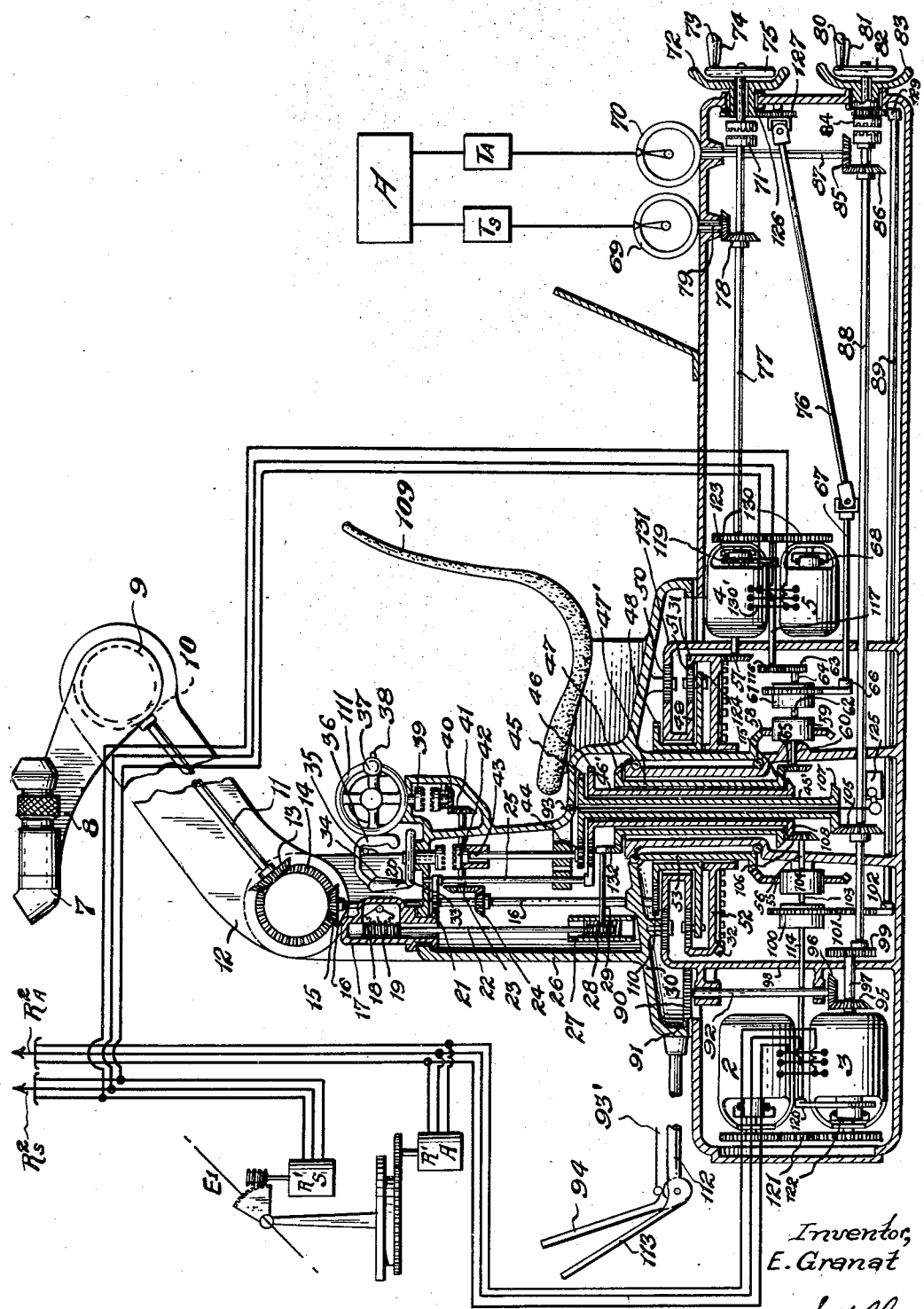
Inventor,
E. Granat
By: Glascock Downing & Seebold
Attys.

Patented Nov. 4, 1941

2,261,249

UNITED STATES PATENT OFFICE 2,261,249

TRANSMITTING STATION FOR DISTANT CONTROL SYSTEMS

Elie Granat, Paris, France, assignor of one-half to Compagnie des Forges et Aciéries de la Marine et d'Homecourt, Paris, France, a French company Application December 20, 1937, Serial No. 180,908
In France December 31, 1936

6 Claims. (Cl. 177—351)

The present invention relates to an improved transmitting station for distant control. This station may be stationary or movable and is adapted for control by attendants who manually produce the transmission of any data provided from elsewhere and of those obtained through local optic sighting means. The corresponding receiver stations may comprise ordnance searchlights or any other suitable devices, controlled both in azimuth and in altitude.

The transmitting station according to the invention which is controlled both by data reproducing means and by optic sighting means comprises a pair of elementary electric transmitters one of which is adapted to act for the transmission of definite angles of azimuth and also to cause the continuous drive in azimuth at a definite speed while the other elementary transmitter performs the same functions for altitudes, both actions of each elementary transmitter being controlled by handwheels forming the data-reproducing means. For these handwheels may be substituted when required corresponding parts controlled by an attendant looking through the optic sighting means such as a telescope which is mechanically linked with the means for controlling the main azimuth and altitude transmitters.

Thus the receivers may be constrained to rotate under the action of the transmitter either through given angles of altitude or azimuth or at given angular speeds in altitude or azimuth in order to follow a moving target. The rotation of the transmitters in both directions is obtained through suitable handwheels affording means for reproducing the indications of altitude or azimuth transmitted by a detecting apparatus, such as a sound detecting station. It is possible to substitute as stated at any desired moment for the control provided by these handwheels the control provided by corresponding handwheels operated by a gunner using the telescope of the transmitter station and this substitution is performed as soon as the gunner, whose telescope has followed the copied indications of a detector apparatus, has caught the target in said telescope.

The attendants provide when continuous drive is required, the permanent shifting between the rotor and of the stator at the different receivers. To this end, the inducing flux of a corresponding auxiliary transmitter rotates through an angle which depends on the required speed of continuous drive. This provides simultaneously the mechanical drive of the brushes of the main transmitter and thereby a general rotation of the different parts of the distance control system for azimuth or altitude including the auxiliary transmitter. There is thus obtained a renewed shifting of the rotor of the telescope controlling transmitter which cannot find a position of equilibrium as long as its inducing flux has not been returned to its original position, the speed of rotation depending on the extent of displacement of the auxiliary transmitter brushes.

In order to prevent any error in the pointing of the telescope by reason of the superimposition of the movements of azimuth and altitude, differentials are provided to correct such errors.

Although I do not intend to limit the scope of my invention I have described hereinbelow, by way of example, its application to the distant control of searchlights for protection against aeroplanes.

The single figure of the accompanying drawing is a detailed vertical cross-section showing the different mechanisms constituting the station as well as their connections with the detecting and receiving stations.

The station illustrated comprises a frame or stand 1 including a pivot around which rotates the tubular support 53 of the turret 30 the upper part 26 of which carries the telescope 7 which may be of any type, straight or bent. The frame 1 houses the distinct control transmitters 2 and 5 for azimuth and altitude respectively and the corresponding auxiliary transmitters 3 and 4 which control respectively the azimuth and the altitude of the telescope 7. The distant control receivers $R_A$ and $R_S$ control the azimuth and altitude of the different controlled parts $E_1$ such as searchlights in the case considered. The detecting station, for instance a sound detecting station A, controls the distant control transmitters $T_S$ and $T_A$ through the agency of which there appear on the dials 69 and 70 carried by the frame 1 the altitude and the azimuth of the target respectively. The data-recopying gunners have at their disposal concentric handwheels 72 and 75 for altitudes and 82 and 83 for azimuths. The handwheels 82 and 75 control directly the rotors of the auxiliary transmitters 3 and 4 respectively which control in their turn respectively the azimuth and the altitude of the telescope 7 at the same time as they produce the corresponding setting of the other parts of the distant control system comprising the above-described transmitter and receivers 2 and $R'_A$ and $R^2_A$ ... or 5 and $R^1_S$ and $R^2_S$. The other handwheels 83 and 72 control the brushes of the same auxiliary transmitters 3 and 4 respectively, with a view to ensuring the starting of the distant control systems and thus the continuous drive in azimuth and altitude respectively of all the controlled devices including the telescope 7 in accordance with the flight of the target. This transmission of angles or control of continuous drive by one or the other of the pairs of handwheels 75 and 82 or 72 and 83 is not the only transmission provided. When the target is caught in the telescope 7, the observer looking through the telescope may act in his turn and replace the gunners acting on the above-mentioned handwheels. To this end he actuates the handwheels 33 and 111 when he wishes to transmit definite angles to the different parts of the distant control system in azimuth and altitude respectively or he may actuate the lever 36 while following the target through the telescope so as to ensure the continuous drive of the same parts both in azimuth and in altitude.

The telescope-operating gunner may or may not be carried along in azimuth with the telescope but it is of advantage to provide a seat 109 for the telescope operating gunner integral with the turret 30 which also carries foot-rests 113 through the agency of a rod of adjustable length 112. The telescope 7 is carried by the turret through a collapsible system of pivoted levers 8 and 12.

The lever 36 used for ensuring continuous drive carries a trigger 35 connected with flexible transmission means such as a cable 93 the part of which arranged along the vertical axis of the pivot 6 is alone shown. This cable actuates a bell crank 125 forming part of a switch controlling through a relay the circuit of a releasing means such as ordnance firing means or a shutter system for searchlights. In the case where the transmission effected is that of definite angles through the handwheels 33 and 111, the above release may be ensured through a pedal 94 controlled by the observer and also connected through a yielding cable 93' with the cable 93 acting on the bell crank 125.

The general arrangement and the working of the station will be understood from the above description and the different mechanisms of transmission of azimuths and altitudes will now be described with more detail.

Transmission of altitudes is obtained first by the handwheel 75 provided with a crank 73. It is sufficient to push the clutch-operating part 74 also carried by the handwheel 75 for connecting said handwheel through the clutch 71 with the shaft 77 driving the rotor of the auxiliary transmitter for altitudes. The shaft 77 acts through gears 78 and 79 on the hand of the recording dial 69 so as to bring it on to the desired value of altitude. The rotation of the rotor of the transmitter 4 produces rotation of the brushes of the transmitter 5 through the gears 130. Such rotation in the transmitter 5 drives the different corresponding receivers R's R²s while it restores equilibrium between the fields in the components of the transmitter 4 electrically connected at 130' through its stator with the transmitter 5. All the receivers rotate thus through an angle corresponding to that of the handwheel 75. The rotor of the receiver 4 mechanically controls the desired rotation of the telescope as to altitude through the pinion 57, the gearwheel 32 carried by the plate 52 and integral with the sunwheel 31 of a double differential described hereinafter, the drive continuing through the planet carrying sleeve 124 of the same differential, the gearwheel 48 carried by the latter, the pinion 110, the bevel wheel 15 keyed to the shaft 16 and the pinion 110, the bevel wheels 14 and 13, the shaft 11 and the bevel gear wheels 10 and 9.

The differential serves for eliminating the error in altitude due to the rotation of the turret in azimuth. This differential comprises a driving sunwheel 31 driven as disclosed through the movable rotor of the auxiliary transmitter 4 and a stationary sunwheel 131 carried by the part 98 integral with the frame 1. The planet wheels 50 are carried by shafts mounted in the turret 30, while the planet wheels 51 rotate on shafts carried by the planet carrying sleeve 124 controlling the telescope as to altitude and rotatably mounted round the tubular shaft 53 of the turret. A floating inner double sunwheel 49 is rotatably mounted on the tubular support or shaft 53 and meshes with both groups of planet wheels.

The ratio between the gear wheels 131 and 31 and 49 are such that if the sunwheel 31 is assumed to be stationary, the rotation of the turret 30 is transmitted integrally to the planet carrier 124. The latter rotates thus together with the shaft 16 at the same speed around the axis of the turret without any relative displacement between last-mentioned parts.

The transmission of angles of altitude to the telescope and to the receivers may also be performed through the handwheel 111 when the telescope operating gunner has caught the target in the field of his telescope. This handwheel 111 controls mechanically the shaft 16 ensuring as disclosed hereinabove, the movements in altitude of the telescope. This mechanical control is performed through a clutch 39, and the bevel gears 40 and 41 and 23 and 24. The clutch 39 is controlled through a projection 38 carried by the crank 37 of the handwheel 111. As the handwheel 111 controls the shaft 16 connected with the rotor of the auxiliary transmitter 4, the rotation of this handwheel 111 will determine the position of the above described gears, a shifting of the rotor of the auxiliary transmitter 4 and of the brushes of the transmitter 5 so as to modify the distribution of the potentials in the rotors of the receivers Rs. Consequently all the receivers will be rotated through corresponding amounts. The operation of the handwheel 111 thus provides the same result as the data recopying handwheel 75.

*Transmission of azimuth angles*

The data-recopying gunner controls the handwheel 82, carrying a clutch operating part 81 and a crank 80, so as to drive the shaft 88 through the clutch 84. The shaft 88 drives a shaft 87 through the gears 85 and 86 and the hand of the azimuth recording dial 70 and the rotor of the auxiliary transmitter 3 through the pinions 99 and the shaft 97. The shaft 97 drives a shaft 92 through the bevel pinions 95 and 96, and a pinion 90 keyed to the shaft 92 drives inner gearwork 91 of the turret 30. The rotation of the rotor of the receiver 3 produces, in a manner similar to that explained for the transmission of altitudes the general rotation of the distant transmission system for azimuth.

The transmission of azimuths by the telescope-operating gunner is performed through the same series of parts starting from the pinion 105 keyed to the shaft 88. To this end the pinion 105 is controlled by the handwheel 33, carrying a clutch-operating part 34 and a crank 20, through the agency of the clutch 42, a shaft 43, a pinion 44 and the two gearwheels 45 and 107 carried by a common sleeve 45' arranged along the axis of rotation of the turret, said last-mentioned wheels 45 and 107 meshing respectively with pinions 44 and 105.

Continuous drive of the altitude controlling system

The data-copying gunner uses for this transmission the handwheel 72 arranged coaxially with reference to the handwheel 75 controlling the transmission of the angles of altitude. This handwheel 72 meshes through a pinion 126 with the pinion 127 controlling a shaft 117 through the shafts 76 and 67, the gears 66, a shaft 64, and gears 63 and 116. The shaft 117 drives pinions 119 and the brushes 123 of the stator of the auxiliary transmitter 4. As has been explained hereinabove, this rotation of the brushes 123 produces a shifting of the inducing flux of the auxiliary transmitter 4 which produces a continuous rotation at a speed depending on the angle of shift of the brushes of the different parts of the distant transmission system for altitudes. In particular the rotor of the auxiliary transmitter 4 drives the mechanism transmitting the altitude to the telescope.

These same brushes 123 may be rotated through the agency of the lever 36 controlled by the telescope-operating gunner. This lever, when it is caused to pivot rotates a toothed sector 19, which sector raises or lowers the rack 18 arranged with the sector 19 in a casing 17 adapted to rotate together with the lever 36 in the horizontal direction. The vertical movements of the rack 18 are transmitted through a spindle 22 to a lower rack 27, meshing with a pinion 28. The rotation of the pinion 28 causes the rotation of the pinion 132 and of a sleeve 47' carrying the two gearwheels 47 and 115. The gearwheel 115 controls through the pinion 65 and the shaft 60 an element of a differential 59 of which another element is controlled by the pinion 58 meshing with the lower gearwheel of the tubular shaft 53 of the turret 30. Consequently the driven element of the differential 59 drives the spindle 62 through an angle proportional to the rotation transmitted by the lever 36 and independently of the rotation of the tubular shaft 53.

Another differential 61 is arranged between the part of the continuous drive system for altitudes connecting the handwheel 72 with elements 66 and 64 and the corresponding part controlled by the lever 36 and leading to the shaft 62. This differential 61 allows the control of altitudes to be performed either from the handwheel 72 or from the lever 36.

Continuous drive for adjusting azimuths

The handwheel 83 rotates the gear 129, the shaft 89, the gears 102 and 101, the differential 100 similar to the differential 61 of the altitude side, a spindle 114, gears 120 and 121 and the brushes 122 of the stator of the auxiliary transmitter 3. The rotation of these brushes provides as in the case of the continuous drive for adjusting altitudes the continuous rotation of the different parts of the distant control system in azimuth at a speed which increases with the angular shifting of the brushes. In particular the auxiliary transmitter 3 makes the turret 30 rotate through the already described transmission 95 and 90.

The continuous adjustment of azimuths may also be effected through the lever 36 acting horizontally on the pivot of the toothed sector 19 and thus on the casing 17. The casing 17 meshes with a pinion 21 which drives a shaft 25 controlling a sleeve 46' carrying gearwheels 46 and 108. A pinion 106 driven by the gear 108 drives an element of a differential 100 through the agency of a spindle 56, a differential 104 and a spindle 103. The differential 104 is constituted in a manner similar to the differential 59 and is adapted to eliminate the error due to the action of the rotation of the tubular shaft 53 carrying the telescope on the transmission of the angular motion provided by the lever 36. The desired correction is introduced through the element of the differential 104 controlled by the pinion 55 meshing with the gearwheel 54 at the lower end of the tubular shaft 53, the other elements of the differential 104 engaging respectively parts 56 and 103.

Of course the above description of the different elements of the station has been given only by way of example and it is possible to imagine many others which may be used without departing from the scope of the invention as defined by the appended claims.

It should be mentioned that the continuous drive in altitudes and in azimuths as described is provided in accordance with my prior Patent No. 1,694,121.

I claim:

1. A transmitting station for distant electric controlled devices actuated by an observer and at least one assistant comprising, optic sighting means for the observer, means for indicating to the assistant two angular datas transmitted from a distant observatory, means controlled by the same assistant for giving to the sighting means two angular displacements according to the indications from the distant observatory and for simultaneously giving the same angular displacements to at least one distant controlled device, means controlled by the observer for giving to the sighting means and distant controlled devices two equal angular displacements, means controlled by the assistant for giving to the sighting means to continuous angular drives and for giving simultaneously the same continuous drives to the distant controlled devices, means controlled by the observer for giving two continuous drives to the sighting means and simultaneously equal continuous drives to the distant controlled devices.

2. A transmitter station for distant electric controlled devices actuated by an observer and at least one assistant comprising, optic sighting means for the observer, means for indicating to the assistant an azimuth and an altitude data transmitted from a distant observatory, two main electric transmitter machines, adapted respectively for the transmission to the distant controlled devices of the azimuth and altitude, two auxiliary transmitters, mechanical means for operatively interconnecting the rotors of the corresponding main and auxiliary transmitters, electric connections between the corresponding main and auxiliary transmitters whereby an angular shift in the stator field of the main transmitter considered provides an equal angular shift in the stator field of the corresponding auxiliary transmitter, manual control means responsive to the action of the assistant for shifting the rotors of the auxiliary transmitters through angles respectively corresponding to the altitude and azimuth transmitted datas, mechanical means connecting the stators of the auxiliary transmitter with the optic sighting means whereby said optic means receives angular displacement proportional respectively to those of the stators, manual control means responsive to the action of the observer adapted to act on said mechanical transmission means whereby the optic sighting means and the stators of the auxiliary transmitters are angularly shifted causing the shifting of the rotor of the main transmitter and of the distant controlled devices, two hand control means responsive to the action of the assistant for giving to the sighting means continuous drives respectively in azimuth and altitude and simultaneously the same continuous drives to the distant controlled devices, hand controlled means responsive to the action of the observer for giving to the sighting means and simultaneously to the distant controlled devices the same continuous drives in azimuth and altitude.

3. A transmitter station for distant electric controlled devices actuated by an observer and at least one assistant comprising, optic sighting means for the observer, means for indicating to the assistant an azimuth and an altitude data transmitted from a distant observatory, two main electric transmitter machines adapted respectively for the transmission to the distant controlled devices of the azimuths and altitudes, two auxiliary transmitters including each a commutator and a set of brushes adapted to rotate over the commutator, mechanical means for interconnecting the rotors of the corresponding main and auxiliary transmitters, electric connections between the corresponding main and auxiliary transmitters whereby an angular shift in the stator field of a main transmitter produces an equal angular shift in the stator field of the corresponding auxiliary transmitter, manual control means responsive to the action of the assistant for shifting the rotors of the auxiliary transmitters through angles respectively corresponding to the altitude and azimuth data transmitted, mechanical means connecting the stators of the auxiliary transmitter with the optic sighting, means whereby said optic means receive angular displacements proportional respectively to those of the stators, manual control means responsive to the action of the observer adapted to act on the mechanical transmission means whereby the optic sighting means and the stators of the auxiliary transmitters are angularly shifted causing the shifting of the rotor of main transmitter and of the distant controlled devices, hand controlled means responsive to the action of the assistant for shifting the set of brushes on the commutator of the auxiliary transmitters whereby the stators of said transmitter rotate continuously with a speed depending on said shifting, hand control means responsive to the action of the observer adapted to act on the mechanical transmission between the last mentioned hand controlled means responsive to the action of the assistant and the sighting means whereby the brushes on the auxiliary transmitter commutators are shifted.

4. In a station as claimed in claim 3, a differential inserted between the auxiliary transmitter for altitudes and the optic sighting means, said differential including an element controlled by the azimuthal rotations of the optic sighting means to compensate the effect of said rotations on the mechanical transmission of altitudes to the optic sighting means.

5. In a station as claimed in claim 3 a differential inserted between the brushes of each auxiliary transmitters and the corresponding brush-shifting control means rotating in azimuth with the optic sighting means and means whereby an element of said differential is adapted to compensate the effect of azimuthal rotation on the transmission between said transmitter and said control means.

6. In a station as claimed in claim 3 a differential inserted between the brushes of each auxiliary transmitters and the corresponding brush-shifting control means rotating in azimuth with the optic sighting means, means whereby an element of said differential is adapted to compensate the effect of azimuthal rotation on the transmission between said transmitter and said control means and a further differential inserted between the above mentioned differential and the auxiliary transmitter brushes, an element of said differential being mechanically connected with the brush shifting control means which are independent of the azimuthal rotation of the optic sighting means.

ELIE GRANAT.